United States Patent [19]
Kalman et al.

[11] Patent Number: 5,879,571
[45] Date of Patent: Mar. 9, 1999

[54] LENSED PLANAR OPTICAL WAVEGUIDES FOR PACKAGING OPTO-ELECTRONIC DEVICES

[75] Inventors: Robert F. Kalman, Cupertino; Edward R. Silva, San Jose; Ronald S. Maynard, Sunnyvale, all of Calif.

[73] Assignee: Optical Networks, Inc., San Jose, Calif.

[21] Appl. No.: 474,777

[22] Filed: Jun. 7, 1995

[51] Int. Cl.$^6$ ....................................................... G02B 6/04
[52] U.S. Cl. ............................................... 216/26; 216/41
[58] Field of Search .......................................... 216/26, 41

[56] References Cited

U.S. PATENT DOCUMENTS

| | | | |
|---|---|---|---|
| 4,338,352 | 7/1982 | Bear et al. | 427/8 |
| 5,346,583 | 9/1994 | Basavanhally | 216/26 |
| 5,518,863 | 5/1996 | Pawluczyk | 216/26 |

*Primary Examiner*—Maria Nuzzolillo
*Assistant Examiner*—Laura Weiner
*Attorney, Agent, or Firm*—Townsend and Townsend and Crew LLP

[57] ABSTRACT

A method for forming lensed ends on waveguides to within very fine tolerances is applicable to many types of waveguides, including single fibers and POWs. The method uses photolithographic materials and techniques, but uses the waveguides themselves to provide the exposing radiation. Thus a method for forming a lens on the end of a waveguide having a waveguiding region and a cladding region includes the step of coating a first end of the waveguide with a photoresist material having sensitivity to at least light in a particular wavelength range. Light in that particular wavelength range is then injected into a second end of the waveguide so that the light within the waveguiding region preferentially exposes the photoresist that covers the waveguiding region at the first end of the waveguide. The method can be carried out with either positive photoresist (where only the exposed portion is removed by development) or negative photoresist (where only the exposed portion remains after development).

26 Claims, 7 Drawing Sheets

LENSED PLANAR OPTICAL WAVEGUIDES FOR PACKAGING OPTO-ELECTRONIC DEVICES

BACKGROUND OF THE INVENTION

The present invention relates generally to fiber optic communications, and more specifically to techniques for interfacing optical waveguides to opto-electronic devices such as laser diodes.

Optical fiber has revolutionized the fields of communications and remote sensing. Among current communications applications of optical fiber are telecommunications links, data communications links, high-speed networks, and cable television. Applications of optical fiber to remote sensing include environmental sensing, industrial process control, and smart structures.

Fiber-optic systems typically use a laser diode as an optical source. In fiber-based systems, the light emitted by the laser diode is typically coupled to an optical fiber within the laser diode package, and the optical fiber exits the package via a feedthrough in the side of the package housing. Other than providing coupling between the laser diode and an optical fiber, the laser diode package provides electrical connections to the laser diode, temperature control of the laser diode, and protects the laser diode from a variety of environmental factors that could adversely impact device performance (e.g., moisture, various chemicals, and mechanical shock). The process of coupling the laser diode to the optical fiber is challenging due to very tight mechanical tolerances, resulting in high packaging costs.

Much of the optical fiber used in optical communications and sensing applications is "single-mode" optical fiber, in which the fiber supports only a single guided optical mode. The spatial profile of the guided mode in standard communications-grade single mode fiber using a 1.3 $\mu$m wavelength optical source is circular and is approximately 9 $\mu$m in diameter. To allow efficient optical coupling from a laser diode to a single-mode fiber, the laser diode must also support only a single guided optical mode. The spatial profile of the guided mode in a typical 1.3 $\mu$m wavelength laser diode is an ellipse with axis dimensions on the order of 1 to 2 $\mu$m.

Two significant problems are encountered in optical coupling between a single mode optical fiber and a single-mode laser diode. First, the required alignment tolerances between the laser diode and the optical fiber along the axes perpendicular to the direction of light propagation are typically under ±1 $\mu$m. Second, because the optical mode size of the fiber is typically much larger than that of the laser diode, simply butting the fiber up against the laser diode results in a large mode mismatch loss. Some intermediate optical coupling assembly placed between the fiber and the laser diode is required to reduce the mode mismatch loss and thus achieve high coupling efficiency between the opto-electronic device and the fiber.

Discrete laser diodes with attached fibers (fiber "pigtails") are widely available commercially. The first issue mentioned above, that of stringent alignment tolerances, is typically addressed in commercial package manufacturing through a closed loop alignment process in which the optical coupling efficiency is actively monitored and maximized by moving the fiber end relative to the laser diode. When the fiber is correctly positioned, it is then fixed in place through soldering or the use of an adhesive.

The second issue mentioned above, that of mode mismatch loss, is typically addressed by placing a lens between the fiber and the laser diode to transform the mode size of the light from the laser diode to more closely match that of the fiber. Such a lens is most commonly implemented in commercial laser diode packages by forming a lens at the end of the optical fiber. Numerous techniques for forming a lens at the fiber end have been demonstrated, including mechanical grinding, chemical etching, and melting/pulling the glass. Using lensed fibers, laser-to-fiber coupling losses of less than 3 dB have been widely achieved in commercial laser diode packages.

Other than laser diodes, other single mode waveguided optical devices include semiconductor optical amplifiers (SOAs), integrated-optic electro-optic devices, and passive optical waveguide structures. These other types of devices can be coupled to optical fibers in packages similar to those used with laser diodes. Opto-electronic (OE) technology has advanced to the point that it is now possible to monolithically integrate multiple devices onto a single substrate. Such integrated devices are known as opto-electronic integrated circuits (OEICs). The major materials families in which OEICs are currently being developed are GaAs and InP. For OEICs to be useful as components in fiber communications systems, they must be packaged with optical fiber interfaces.

FIG. 1 schematically shows a package 10 for an OEIC 12 which consists of an array of eight laser diodes 13. The output light from each laser diode is coupled to a respective lensed fiber 15. Each fiber is shown as having a waveguiding core 17 surrounded by a cladding 20. Each of the fiber ends closest to the OEIC is formed with a lens portion 25. The lensed fibers may be fabricated as described above. OEIC 12 and the lensed ends of fibers 15 are located within a housing 27.

In principle, each fiber in the OEIC package can be individually actively positioned and fixed in place, in the same manner as is done with a discrete laser diode. However, for larger numbers of fibers (e.g., 8 or more), the multiple active alignment processes lead to a very time-consuming and expensive packaging process. Additionally, because there is a finite yield associated with each fiber-to-laser diode alignment, the net yield for packages with larger numbers of fibers can become quite low. Furthermore, some OEICs may have waveguides which are on a pitch which is less than one fiber diameter (standard fiber diameter=125 $\mu$m). This does not allow fibers to be interfaced to adjacent waveguides.

It has been attempted to get around the need to position each lensed fiber individually by metallizing the fibers and placing (soldering) them in metallized V-grooves on a silicon substrate. The entire array of fibers is then aligned to an array of devices on an OEIC in a single active positioning step. However, this technique has not been effective in achieving high array coupling efficiency due to inadequate fiber positioning accuracy. Factors leading to inadequate accuracy in fiber positioning include variance in fiber cladding diameter, non-concentric positioning of the fiber core relative to the cladding, non-concentric lens position relative to the core center, and imperfect seating of the fiber in the V-groove. These factors add up to give a positioning accuracy in the range of ±2 $\mu$m. This is significantly more than the required tolerance of under ±1 $\mu$m, and thus V-groove fiber placement does not provide acceptable performance for OEIC-to-fiber array coupling.

SUMMARY OF THE INVENTION

The present invention provides a method for forming lensed ends on optical waveguides to within very fine tolerances. The technique is applicable to many types of waveguides, including single fibers and planar optical waveguides (POWs). An array of POWs, with lenses formed according to the invention, can be used to interface fibers to an OEIC. The lens fabrication process is self-aligning relative to the waveguides, i.e., the lenses are automatically perfectly centered with respect to the waveguides. The invention thus overcomes tolerance problems in the prior art.

In short, the present invention uses photolithographic materials and techniques, but uses the waveguides themselves to provide the exposing radiation. In a first set of embodiments, a method for forming a lens on the end of a waveguide having a waveguiding region and a cladding region includes the step of depositing a layer of photoresist on a first end of the waveguide. Light in a wavelength range to which the photoresist is sensitive, is then injected into a second end of the waveguide so that the light within the waveguiding region preferentially exposes the photoresist that is aligned with the waveguiding region at the first end of the waveguide.

The method according to the first set of embodiments can be carried out with either positive photoresist (where only the exposed portion is removed by development) or negative photoresist (where only the exposed portion remains after development). In either case, the first end of the waveguide is subjected to a set of steps including at least a developing step to result in a state where the waveguiding region, but not the cladding region, at the first end of the waveguide is covered by a protective layer. This protective layer may be an etch-resistant material (such as metal or silicon nitride) or may be hardened photoresist, depending on the type of photoresist used.

The first end of the waveguide is etched so as to remove a portion of the cladding region surrounding a portion of the waveguiding region adjacent the first end of the waveguide. This leaves a portion of the waveguiding region protruding beyond the cladding region. The protective layer is then removed and the protruding portion of the waveguiding region is melted or otherwise rounded to define the desired lens element.

In a first of this first set of embodiments, using positive photoresist, the development results in hardened photoresist on the cladding region at the first end of the waveguide but no photoresist on the waveguiding region at the first end of the waveguide. After development, an etch-resistant material is deposited on the first end of the waveguide, and the photoresist is removed in a lift-off process. This leaves a layer of etch-resistant material only on the waveguiding region to define the protective layer.

In a second of this first set of embodiments, using negative photoresist, the development results in hardened photoresist on the waveguiding region at the first end of the waveguide and no photoresist on the cladding region at the first end of the waveguide. The hardened photoresist on the waveguiding region at the first end of the waveguide thus defines the protective layer.

In a second set of embodiments, a separate layer of transparent material is used to form the lens element. This layer can be a glass or polymer, preferably with a lower melting point than that of the waveguide core material. In this set of embodiments, a method for forming a lens on the end of a waveguide having a waveguiding region and a cladding region includes the steps of depositing layers of the transparent material and a photoresist material on a first end of the waveguide. The method further includes the step of injecting light in a wavelength range to which the photoresist material is sensitive into a second end of the waveguide so that the light within the waveguiding region preferentially exposes the photoresist that is aligned with the waveguiding region at the first end of the waveguide.

The method further includes the steps of developing the photoresist and removing some or all of the portion of the transparent layer overlying the cladding region. This leaves a protruding portion of the transparent layer aligned with the end of the waveguiding region, which is then used to form the lens as in the first set of embodiments.

The order of the various steps is different for different embodiments. The photoresist is developed after the light is injected, but the order in which the transparent layer and photoresist layer are deposited depends on the type of photoresist. Similarly, the point in the method at which the hardened photoresist is removed depends on the type of photoresist.

In a first of this second set of embodiments, the transparent layer is deposited on the first end of the waveguide, a layer of positive photoresist is deposited, and the photoresist exposed and developed so as to remove the portion of the photoresist aligned with the end of the waveguiding region. A layer of an etch-resistant material is then deposited, with a portion being deposited directly on the portion of the transparent layer aligned with the waveguiding region and another portion deposited on the hardened photoresist that is aligned with the cladding region. The photoresist, with its overlying portion of the protective layer is then removed, thus leaving only the portion of the protective layer aligned with the end of the waveguiding region.

In a second of this second set of embodiments, a layer of positive photoresist is deposited on the first end of the waveguide, and exposed and developed so as to remove the portion of the photoresist aligned with the end of the waveguiding region. The transparent layer is then deposited, with a portion being deposited directly on the end of the waveguiding region and another portion deposited on the hardened photoresist that is aligned with the cladding region. The photoresist, with its overlying portion of the transparent layer is then removed, thus leaving only the portion of the transparent layer aligned with the end of the waveguiding region.

In a third of this second set of embodiments, the transparent layer is deposited on the first end of the waveguide, followed by a layer of negative photoresist. The photoresist is exposed and developed so that only the portion aligned with the end of the waveguiding region remains, protecting the portion of the transparent layer on the waveguiding region. The unprotected portion of the transparent layer is then removed, as by etching, after which the photoresist is removed. This leaves only the portion of the transparent layer aligned with the end of the waveguiding region.

This self-aligning lensing process, taken together with high positioning accuracy achieved in fabrication of the POWs, allows lensed POW-based packages to achieve high coupling efficiency between arrays of single-mode fibers and OEICs.

A further understanding of the nature and advantages of the present invention may be realized by reference to the remaining portions of the specification and the drawings.

DESCRIPTION OF SPECIFIC EMBODIMENTS

Figure 1:
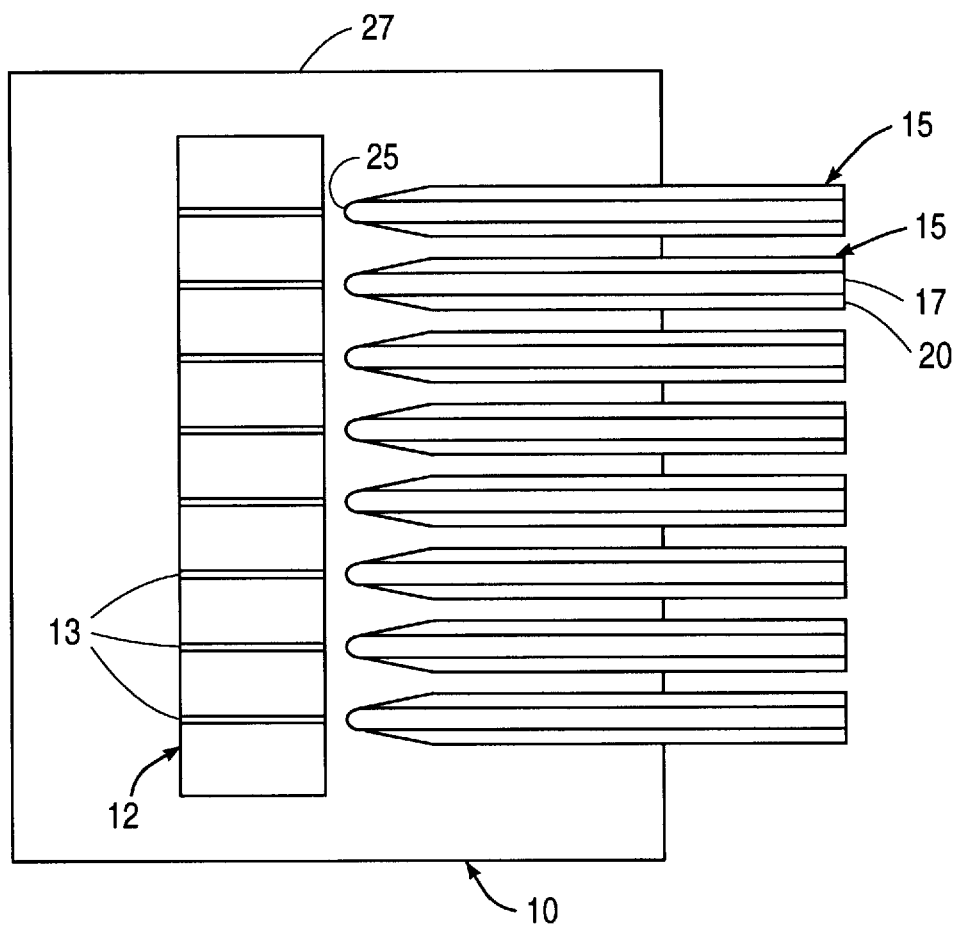
FIG. 1 is a schematic view of a prior art package interfacing an array of lensed fibers to an array of laser diodes in an opto-electronic integrated circuit (OEIC)
Figure 2:
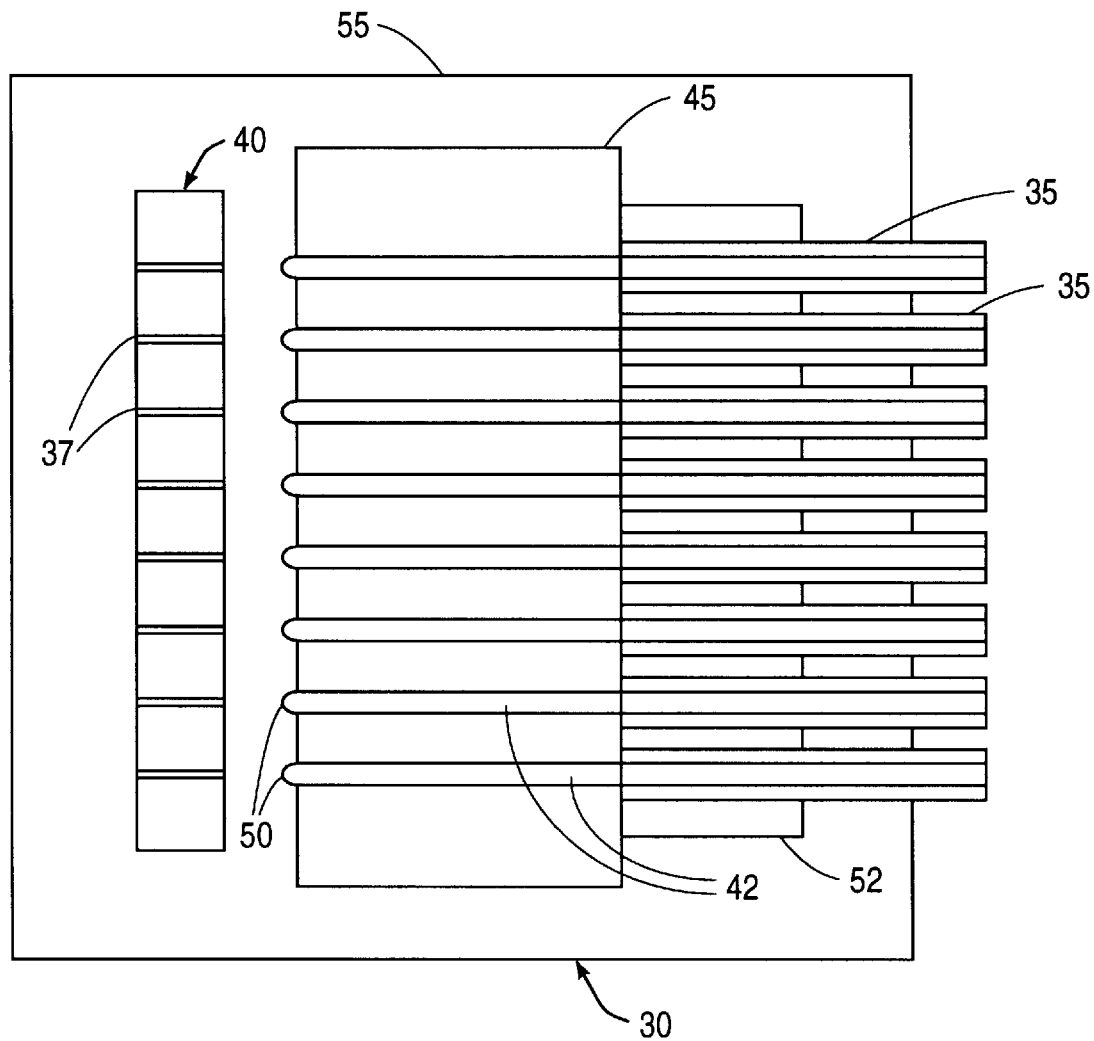
FIG. 2 is a schematic of a package interfacing an array of fibers to an array of laser diodes in an opto-electronic integrated circuit using an array of planar optical waveguides (POWs) having an array of lensed waveguide ends.

Device Overview FIG. 2 is a schematic of a package 30 interfacing an array of fibers 35 to an array of laser diodes 37 in an opto-electronic integrated circuit (OEIC) 40. This is effected by an array of planar optical waveguides (POWs) 42 on a substrate 45. Each fiber 35 is optically coupled to a POW simply by butting it against the POW.

The end of each POW close to the OEIC has a lens 50 formed on it. The lens provides the same mode matching function as the lens at the end of a fiber used in conventional discrete laser diode packaging, leading to high optical coupling efficiency. The present invention provides methods for forming these lenses, as will be described in detail below.

POW devices on a number of different materials have been widely demonstrated. The common materials used for implementing POWs are $SiO_2$ (silica) and polymers. The POWs are typically formed on top of a silicon substrate. Standard and custom silica POW products are commercially available from at least one vendor, Photonic Integration Research, Inc. (PIRI). Numerous commercial companies are pursuing POW technology development through government and internal R&D funding.

It is desirable that the fibers and POWs have essentially the same mode size (e.g., a 9 μm diameter circular mode for a typical 1.3 μm wavelength single-mode fiber) to minimize the mode mismatch loss in coupling between them. This is readily achievable. The alignment tolerance in coupling between two 9 μm modes is approximately ±2 μm.

As discussed above, mounting fibers in silicon V-grooves tends not to provide sufficiently good alignment for coupling directly to the laser diodes. However, the fibers can be mounted in silicon V-grooves and aligned to the POWs with adequate accuracy. Thus, while the fibers can be individually aligned, they may also be passively aligned by mounting them in V-grooves formed in a silicon substrate 52. OEIC 40, POWS 42, and fibers 35 on substrate 52 are located within a housing 55.

At the other end of the POWs, where they are coupled to the devices on the OEICs, each POW must be positioned relative to the OEIC device to which it is coupled with an accuracy which is typically less than ±1 μm, and often less than ±0.5 μm. The center of the lens on each POW must be positioned relative to the OEIC device with this same accuracy. Because the entire array of lensed POWs is aligned relative to the OEIC in a single alignment step, the position of each POW and its lens relative to the others must be within less than the total alignment tolerance of its "ideal" position. This ideal position is such that the POWs are registered to each other with exactly the same relative position as the OEIC devices are to each other. Because the POWs are photolithographically defined, they can be held to relative positioning accuracies of less than ±0.1 μm. It is important that the lenses be fabricated with similar alignment tolerances.

The present invention provides methods for fabricating the lenses at the ends of optical waveguides, including POWs, fibers, and other guided wave structures. The invention uses photolithographic materials and techniques, but uses the waveguides themselves to provide the exposing radiation. In a first set of embodiments, the lenses are formed of the waveguiding material itself while in a second set, a separate transparent layer is deposited and patterned. Each set of embodiments includes embodiments based on the use of positive photoresist as well as embodiments based on the use of negative photoresist. An optical waveguide consists of a core region in which the light is guided, and a cladding region which is used to confine the light to the core. A lens manufactured according to the invention is automatically centered on the core. Additionally, the focal length of the lens can be varied over a large range and can be accurately controlled.

First Set of Embodiments

FIGS. 3A–3H show the process steps of a method for forming a lens on the end of a waveguide according to a first embodiment of the first set of embodiments of the invention. This embodiment uses positive photoresist, i.e., photoresist where only the exposed portion is removed by development. The figures show a waveguide device 60 having one or more core (waveguiding) regions 62 and surrounding cladding regions 65.

Figure 3A:
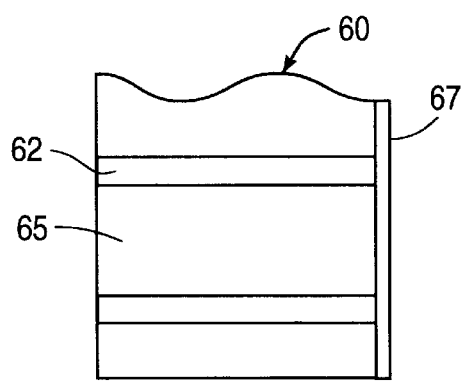
FIGS. 3A–3H show the process steps of a method for forming a lens on the end of a waveguide according to a first embodiment of a first set of embodiments of the invention.

FIG. 3A shows device 60 after a thin layer 67 of positive photoresist has been deposited on the end of each waveguide.

Figure 3E:
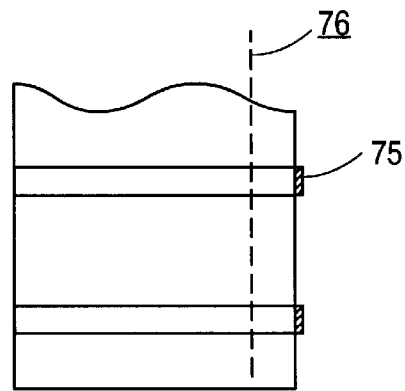
Figure 3B:
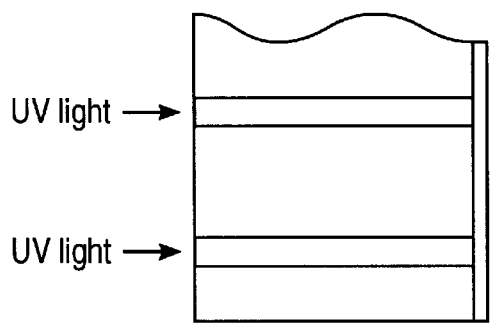

FIG. 3B shows ultraviolet light being launched into the core at the opposite end of the waveguide from the photoresist, which exposes the photoresist directly over the core.

Figure 3F:
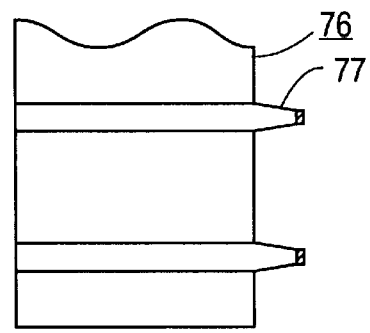
Figure 3C:
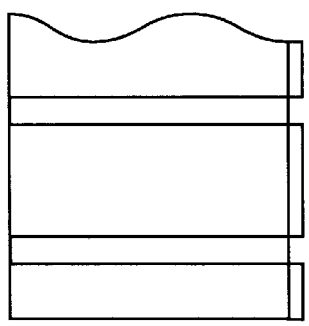

FIG. 3C shows the exposed photoresist having been removed during a standard positive photoresist development process.

Figure 3G:
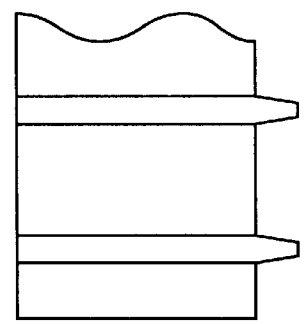
Figure 3D:
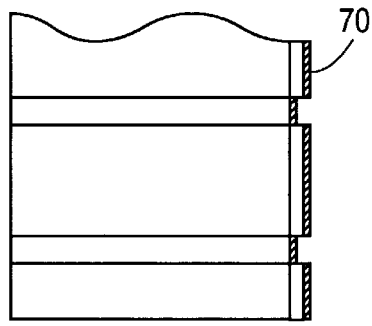

FIG. 3D shows a thin layer 70 of a "mask" material having been deposited over the end face of the waveguide, including both regions with and without photoresist. This mask material must have the property that is not etched away during the step in which the waveguide is etched. A metal such as chrome, or a two layer chrome/gold deposition, is a good choice for the mask.

FIG. 3E shows the remaining photoresist having been removed through a standard photoresist lift-off process, which also removes the mask which had been deposited over the photoresist. A mask portion 75 remains over the core.

FIG. 3F shows the end of the POW having been etched down to a surface 76. Surface 76, which was formerly inside the waveguide (see FIG. 3E), now becomes a new outer surface for the cladding, and is referred to as the cladding bounding surface. The waveguide region protected by the mask portion is not etched, which leaves a protruding waveguide region 77 directly over the core. This etching can either be a standard isotropic wet chemical etch, or can be an anisotropic etching process such as reactive ion etching (RIE).

FIG. 3G shows the mask having been removed through an appropriate etching process so as to leave protruding portion 77 of the core exposed.

Figure 3H:
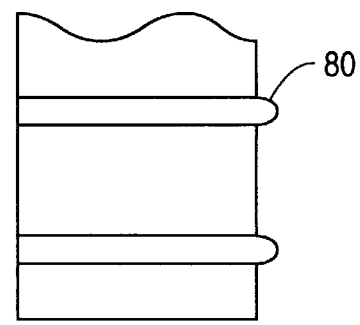

FIG. 3H shows the waveguide protrusion having been formed into a lens 80 through melting, or through further etching. The melting can be accomplished by any of a number of techniques, including the use of a $CO_2$ laser, an electrical discharge in the vicinity of the waveguide protrusion, or a torch.

FIGS. 4A–4H show the process steps of a method for forming a lens on the end of a waveguide according to a second embodiment of the first set of embodiments of the invention. This embodiment uses negative photoresist, i.e., photoresist where only the exposed portion remains after development. Corresponding reference numerals denote corresponding elements.

Figure 4A:
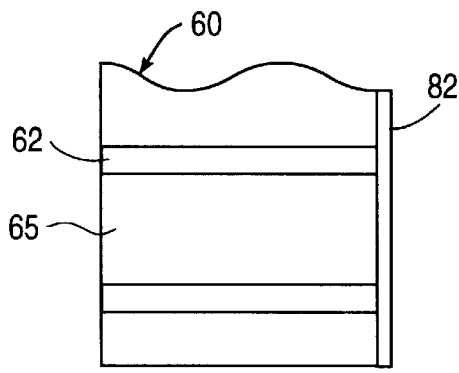
FIGS. 4A–4F show the process steps of a method for forming a lens on the end of a waveguide according to a second embodiment of the first set of embodiments of the invention.

FIG. 4A shows the device after a thin layer 82 of negative photoresist has been deposited on the end of the waveguide.

Figure 4E:
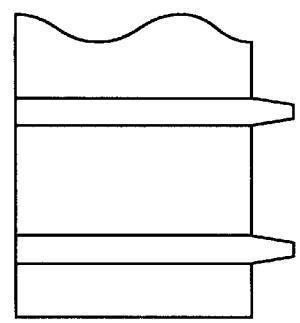
Figure 4B:
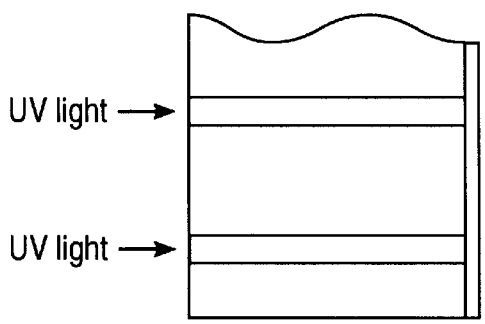

FIG. 4B shows ultraviolet light being launched into the core at the opposite end of the waveguide from the photoresist, which exposes the photoresist directly over the core.

Figure 4F:
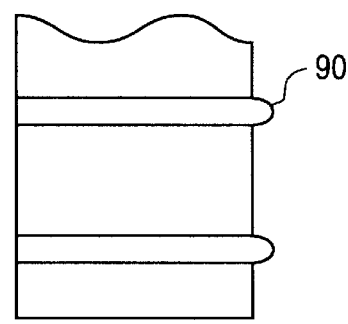
Figure 4C:
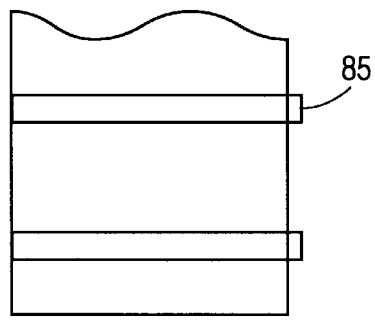

FIG. 4C shows the unexposed photoresist having been removed during a standard negative photoresist development process. This leaves a mask 85 comprising hardened photoresist over the core.

Figure 4D:
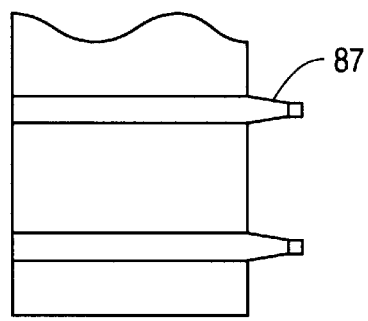

FIG. 4D shows the end of the POW having been etched. The waveguide region protected by photoresist mask 85 is not etched, which leaves a raised waveguide region 87 directly over the core. This etching can either be a standard isotropic wet chemical etch, or can be an anisotropic etching process such as reactive ion etching (RIE).

FIG. 4E shows the remaining photoresist having been removed through an appropriate etching process to leave the protruding portion exposed.

FIG. 4F shows the waveguide protrusion having been formed into a lens 90 through melting, or through further etching.

Second Set of Embodiments

FIGS. 5A–5I show the process steps of a method for forming a lens on the end of a waveguide according to a first embodiment of the second set of embodiments of the invention. As opposed to the first set of embodiments, this set of embodiments uses an optical material deposited on the end of the waveguide. Through subsequent processing, this deposited optical material is used to create lenses at the ends of the waveguides, and is referred to henceforth as the "lens material". The figures show a waveguide device 60 having one or more core (waveguiding) regions 62 and surrounding cladding regions 65.

Figure 5A:
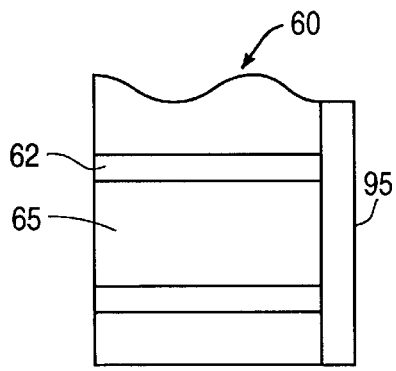
FIGS. 5A–5I show the process steps of a method for forming a lens on the end of a waveguide according to a first embodiment of a second set of embodiments of the invention.

FIG. 5A shows device 60 after a layer 95 of a lens material has been deposited at the end of each waveguide. The lens material should ideally have an index of refraction closely matched to that of the waveguide material and a melting temperature lower than that of the waveguide material. Potential lens materials include low-melting temperature glasses and various polymers.

Figure 5E:
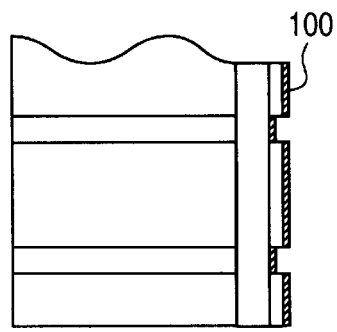
Figure 5I:
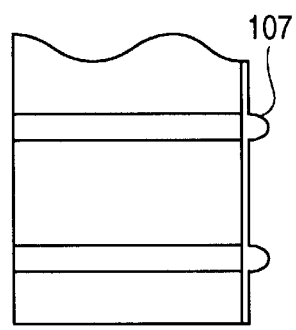
Figure 5B:
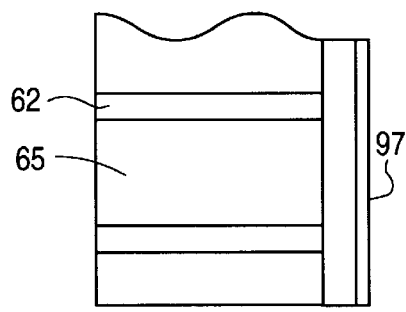

FIG. 5B shows device 60 after a thin layer 97 of positive photoresist has been deposited on top of the lens material layer.

Figure 5F:
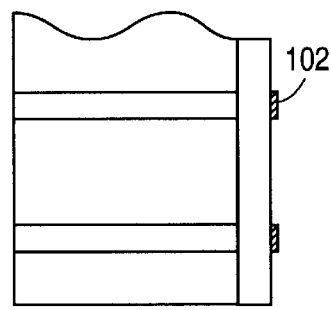
Figure 5C:
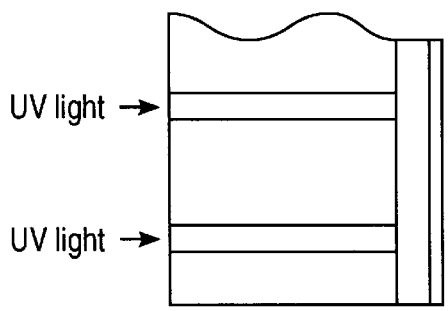

FIG. 5C shows ultraviolet light being launched into the core at the opposite end of the waveguide from the photoresist, which exposes the photoresist directly over the core.

Figure 5G:
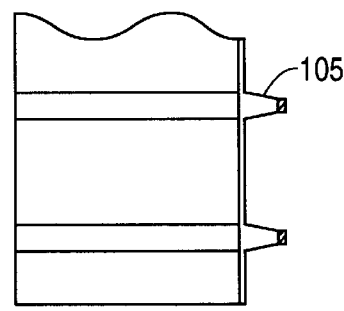
Figure 5D:
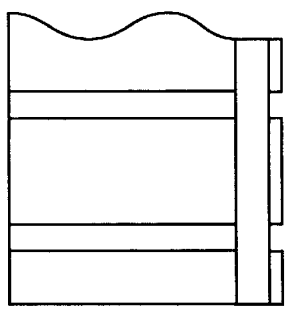

FIG. 5D shows the exposed photoresist having been removed during a standard positive photoresist development process.

FIG. 5E shows a thin layer 100 of a "mask" material having been deposited over the lens material layer, including both regions with and without photoresist. This mask material must have the property that is not etched away during the step in which the lens material layer is etched. A metal such as chrome, or a two layer chrome/gold deposition, is a good choice for the mask.

FIG. 5F shows the remaining photoresist having been removed through a standard photoresist lift-off process, which also removes the mask which had been deposited over the photoresist. A mask portion 102 remains on the lens material layer over the core.

FIG. 5G shows the lens material layer having been etched. The lens material layer over the waveguide region is protected by the mask portion and is not etched, which leaves a protruding lens material layer region 105 directly over the core. This etching can either be a standard isotropic wet chemical etch, or can be an anisotropic etching process such as reactive ion etching (RIE). Note that a thin layer of the lens material remains over the cladding. This is not necessary.

Figure 5H:
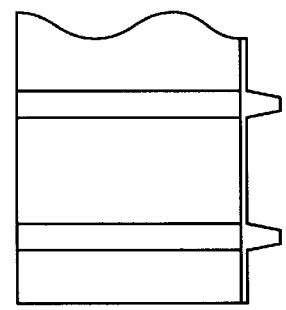

FIG. 5H shows the mask having been removed through an appropriate etching process so as to leave protruding portion 105 of the lens material layer exposed.

FIG. 5I shows the lens material layer protrusion having been formed into a lens 107 through melting, or through further etching. The melting can be accomplished as mentioned above, or, if the lens material has a sufficiently low melting point relative to the waveguide material, by placing the assembly in an oven.

FIGS. 6A–6F show the process steps of a method for forming a lens on the end of a waveguide according to a second embodiment of the second set of embodiments of the invention.

Figure 6A:
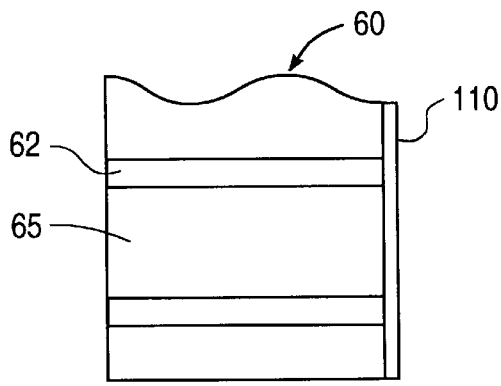
FIGS. 6A–6F show the process steps of a method for forming a lens on the end of a waveguide according to a second embodiment of the second set of embodiments of the invention.

FIG. 6A shows device 60 after a thin layer 110 of positive photoresist has been deposited at the end of each waveguide.

Figure 6E:
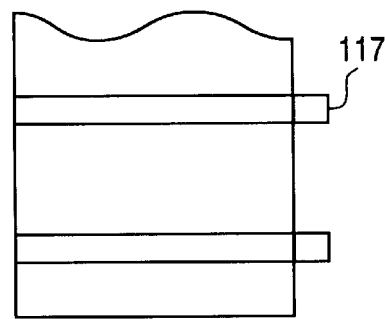
Figure 6B:
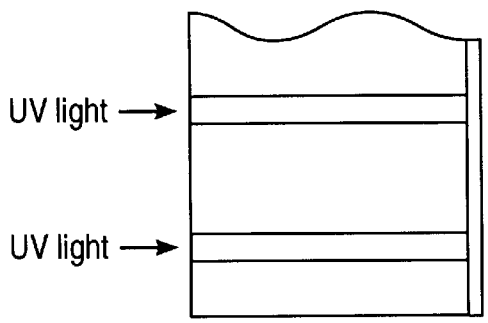

FIG. 6B shows ultraviolet light being launched into the core at the opposite end of the waveguide from the photoresist, which exposes the photoresist directly over the core.

Figure 6F:
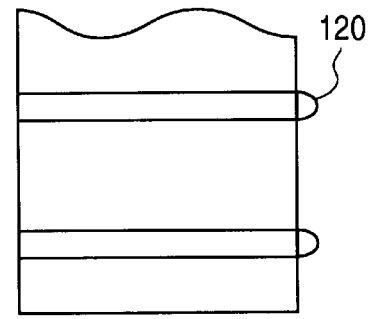
Figure 6C:
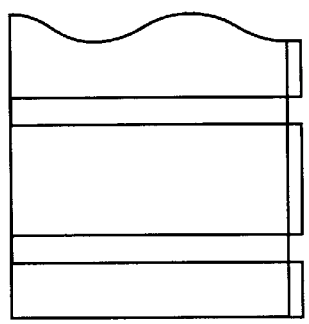

FIG. 6C shows the exposed photoresist having been removed during a standard positive photoresist development process.

Figure 6D:
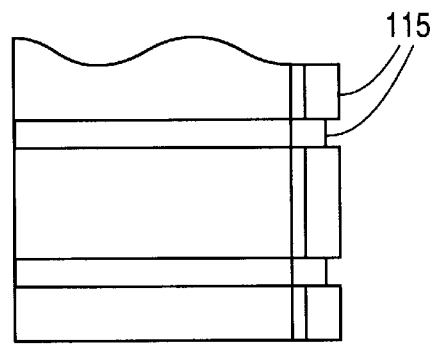

FIG. 6D shows a thin layer 115 of a lens material having been deposited over the end face of the waveguide, including both regions with and without photoresist.

FIG. 6E shows the remaining photoresist having been removed through a standard photoresist lift-off process, which also removes the lens material which had been deposited over the photoresist. A lens material layer portion 117 remains over the core.

FIG. 6F shows the lens material layer protrusion having been formed into a lens 120 through melting, or through further etching.

FIGS. 7A–7F show the process steps of a method for forming a lens on the end of a waveguide according to a third embodiment of the second set of embodiments of the invention. This embodiment uses negative photoresist, i.e., photoresist where only the exposed portion remains after development.

Figure 7A:
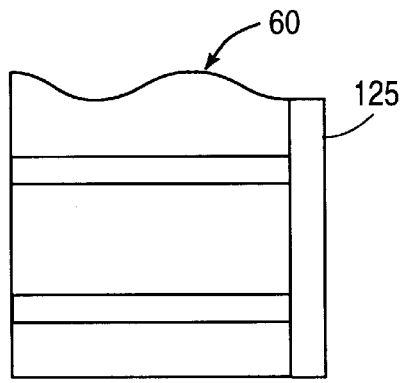
FIGS. 7A–7G show the process steps of a method for forming a lens on the end of a waveguide according to a third embodiment of the second set of embodiments of the invention.

FIG. 7A shows device 60 after a layer 125 of a lens material has been deposited at the end of each waveguide. The lens material should ideally have an index of refraction closely matched to that of the waveguide material.

Figure 7E:
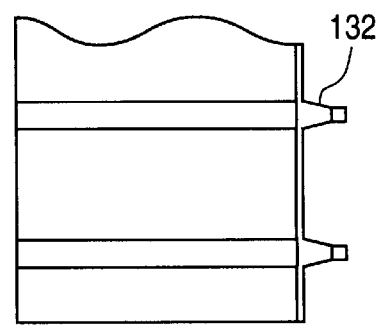
Figure 7B:
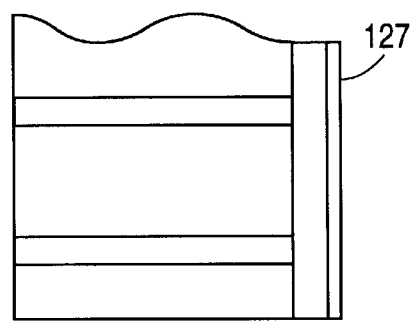

FIG. 7B shows device 60 after a thin layer 127 of positive photoresist has been deposited on top of the lens material layer.

Figure 7F:
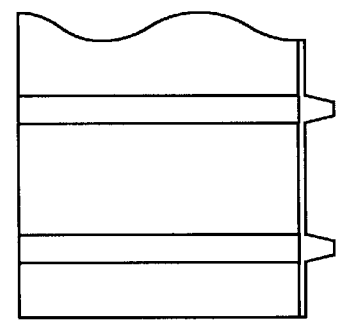
Figure 7C:
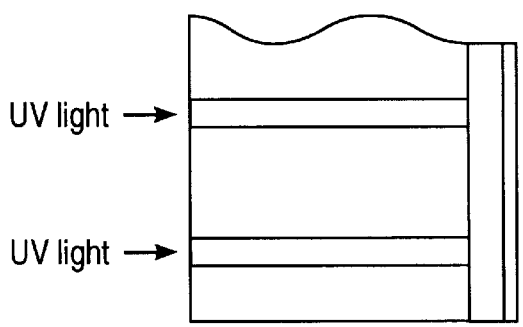

FIG. 7C shows ultraviolet light being launched into the core at the opposite end of the waveguide from the photoresist, which exposes the photoresist directly over the core.

Figure 7G:
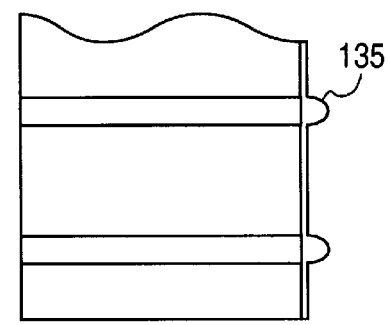
Figure 7D:
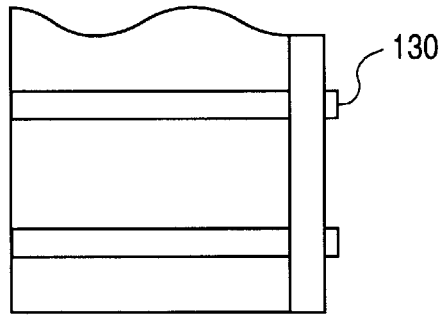

FIG. 7D shows the unexposed photoresist having been removed during a standard negative photoresist development process. This leaves a mask 130 comprising hardened photoresist on the lens material layer directly over the core.

FIG. 7E shows the end of the lens material layer having been etched. The lens material layer protected by photoresist mask 85 is not etched, which leaves a raised lens material region 132 directly over the core. This etching can either be a standard isotropic wet chemical etch, or can be an anisotropic etching process such as reactive ion etching (RIE).

FIG. 7F shows the remaining photoresist having been removed through an appropriate etching process to leave the protruding lens material layer portion exposed.

FIG. 7G shows the lens material layer protrusion having been formed into a lens 135 through melting, or through further etching.

CONCLUSION

In conclusion, it can be seen that the present invention provides a simple and elegant technique for forming lenses on the end of optical waveguides. As mentioned above, an extremely critical factor for the lensed POWs to be useful for multifiber OEIC packaging is that the lenses be nearly perfectly centered (less than ±0.5 µm) with respect to their respective waveguide cores. The present invention provides essentially perfect centering of the lens with respect to the waveguide core automatically because the light exposing the photoresist is guided through the core. The process is quite simple, all processing steps can be performed using relatively inexpensive and widely available equipment, and the process is well-suited to low-cost volume batch processing.

While the above is a complete description of specific embodiments of the invention, various modifications, alternative constructions, and equivalents may be used. For example, certain possible alterations in the etching processes and lensing processes (steps shown in FIGS. 3F–3H for the positive photoresist process, and the steps shown in FIGS. 3D–3F of the negative photoresist process) can be used for a wide variety of different optical waveguide materials and structures. Therefore, the above description should not be taken as limiting the scope of the invention as defined by the claims.

What is claimed is:

1. A method for forming a lens element on the end of a waveguide, the waveguide having first and second ends, the waveguide having a waveguiding region and a cladding region that extend between the first and second ends, the waveguide being bounded at the first end by a first end surface that includes a waveguiding surface portion and an abutting cladding surface portion, the method comprising the steps of:

depositing a layer of photoresist on the first end surface of the waveguide so that a first portion of the photoresist covers the waveguiding surface portion and a second portion of the photoresist covers the cladding surface portion, the photoresist material having sensitivity at least to light in a particular wavelength range;

injecting light in the particular wavelength range into the second end of the waveguide so that the light traveling along the waveguiding region between the first and second ends and emerging from the waveguiding region at the first end selectively exposes the first portion of the photoresist;

subjecting the first end of the waveguide to a set of steps that include a developing step to result in a protective layer aligned with the waveguiding surface portion;

removing a portion of the cladding region bounded by the cladding surface portion and a cladding bounding surface disposed between the cladding surface portion and the second end so as to leave a protruding portion of the waveguiding region that extends beyond the cladding bounding surface;

removing the protective layer; and forming the protruding portion of the waveguiding region to define the lens element.

2. The method of claim 1 wherein:

the photoresist has the property that said injecting step and said developing step result in hardened photoresist on the cladding surface portion but no photoresist left on the waveguiding surface portion; and said set of steps includes the steps, performed after said developing step, of depositing metal or silicon nitride on the first end of the waveguide and removing the photoresist with metal or silicon nitride thereon so as to leave a layer of metal or silicon nitride on the waveguiding surface portion to define the protective layer.

3. The method of claim 1 wherein:

the photoresist has the property that said injecting step and said developing step result in hardened photoresist on the waveguiding surface portion but no photoresist left on the cladding surface portion; and the protective layer is defined by the hardened photoresist on the waveguiding region at the first end of the waveguide.

4. The method of claim 1 wherein said removing step is an etching step.

5. The method of claim 1 wherein said forming step is a melting step.

6. The method of claim 1 wherein said forming step is an etching step.

7. The method of claim 1 wherein said waveguide is one of an array of planar optical waveguides on a single substrate.

8. A method for forming a lens element on the end of a waveguide, the waveguide having first and second ends, the waveguide having a waveguiding region and a cladding region that extend between the first and second ends, the waveguide being bounded at the first end by a first end surface that includes a waveguiding surface portion and an abutting cladding surface portion, the method comprising the steps of:

depositing a layer of positive photoresist on the first end surface of the waveguide so that a first portion of the photoresist covers the waveguiding surface portion and a second portion of the photoresist covers the cladding surface portion, the photoresist having sensitivity at least to light in a particular wavelength range;

injecting light in the particular wavelength range into the second end of the waveguide so that the light traveling along the waveguiding region between the first and second ends and emerging from the waveguiding region at the first end selectively exposes the first portion of the photoresist;

developing the photoresist so as to harden the second portion of the photoresist and remove the first portion of the photoresist;

depositing a protective layer on the first end of the waveguide so that a first portion of the protective layer covers the waveguiding surface portion and a second portion of the protective layer covers the second portion of the photoresist;

removing the second portion of the photoresist with the second portion of the protective layer thereon so as to leave the first portion of the protective layer on the waveguiding surface portion;

removing a portion of the cladding region bounded by the cladding surface portion and a cladding bounding surface disposed between the cladding surface portion and the second end so as to leave a protruding portion of the waveguiding region that extends beyond the cladding bounding surface;

removing the first portion of the protective layer; and forming the protruding portion of the waveguiding region to define the lens element.

9. The method of claim 8 wherein said protective layer is a metal layer.

10. The method of claim 8 wherein said step of removing a portion of the cladding region is an etching step.

11. The method of claim 8 wherein said forming step is a melting step.

12. The method of claim 8 wherein said forming step is an etching step.

13. A method for forming a lens element on the end of a waveguide, the waveguide having first and second ends, the waveguide having a waveguiding region and a cladding region that extend between the first and second ends, the waveguide being bounded at the first end by a first end surface that includes a waveguiding surface portion and an abutting cladding surface portion, the method comprising the steps of:

depositing a layer of negative photoresist on the first end surface of the waveguide so that a first portion of the photoresist covers the waveguiding surface portion and a second portion of the photoresist covers the cladding surface portion, the photoresist having sensitivity at least to light in a particular wavelength range;

injecting light in the particular wavelength range into the second end of the waveguide so that the light traveling along the waveguiding region between the first and second ends and emerging from the waveguiding region at the first end selectively exposes the first portion of the photoresist;

developing the photoresist so as to harden the first portion of the photoresist and remove the second portion of the photoresist;

removing a portion of the cladding region bounded by the cladding surface portion and a cladding bounding surface disposed between the cladding surface portion and the second end so as to leave a protruding portion of the waveguiding region that extends beyond the cladding bounding surface;

removing the first portion of the photoresist; and forming the protruding portion of the waveguiding region to define the lens element.

14. The method of claim 13 wherein said step of removing a portion of the cladding region is an etching step.

15. The method of claim 13 wherein said forming step is a melting step.

16. The method of claim 13 wherein said forming step is an etching step.

17. The method of claim 13 wherein said waveguide is one of an array of planar optical waveguides on a single substrate.

18. A method for forming a lens element on the end of a waveguide, the waveguide having first and second ends, the waveguide having a waveguiding region and a cladding region that extend between the first and second ends, the waveguide being bounded at the first end by a first end surface that includes a waveguiding surface portion and an abutting cladding surface portion, the method comprising the steps of:

depositing a layer of positive photoresist on the first end surface of the waveguide so that a first portion of the photoresist covers the waveguiding surface portion and a second portion of the photoresist covers the cladding surface portion, the photoresist having sensitivity at least to light in a particular wavelength range;

injecting light in the particular wavelength range into the second end of the waveguide so that the light traveling along the waveguiding region between the first and second ends and emerging from the waveguiding region at the first end selectively exposes the first portion of the photoresist;

developing the photoresist so as to harden the second portion of the photoresist and remove the first portion of the photoresist;

depositing a transparent material layer on the first end of the waveguide so that a first portion of the transparent material layer covers the waveguiding surface portion and a second portion of the transparent material layer covers the second portion of the photoresist;

removing the second portion of the photoresist with the second portion of the transparent material layer thereon so as to leave the first portion of the transparent material layer on the waveguiding surface portion; and forming the first portion of the transparent material layer to define the lens element.

19. The method of claim 18 wherein said forming step is a melting step.

20. The method of claim 18 wherein said forming step is an etching step.

21. A method for forming a lens element on the end of a waveguide, the waveguide having first and second ends, the waveguide having a waveguiding region and a cladding region that extend between the first and second ends, the waveguide being bounded at the first end by a first end surface that includes a waveguiding surface portion and an abutting cladding surface portion, the method comprising the steps of:

depositing a transparent material layer on the first end surface of the waveguide so that a first portion of the transparent material layer covers the waveguiding surface portion and a second portion of the transparent material layer covers the cladding surface portion;

depositing a layer of negative photoresist on the transparent material layer so that a first portion of the photoresist covers the first portion of the transparent material layer and a second portion of the photoresist covers the second portion of the transparent material layer, the photoresist having sensitivity at least to light in a particular wavelength range;

injecting light in the particular wavelength range into the second end of the waveguide so that the light traveling along the waveguiding region between the first and second ends and emerging from the waveguiding region at the first end selectively exposes the first portion of the photoresist;

developing the photoresist so as to harden the first portion of the photoresist and remove the second portion of the photoresist;

removing at least some of the second portion of the transparent material layer to leave a protruding portion of the transparent material layer aligned with the waveguiding surface portion;

removing the hardened photoresist from the protruding portion of the transparent material layer; and forming the protruding portion of the transparent material layer to define the lens element.

22. The method of claim 21 wherein said forming step is a melting step.

23. The method of claim 21 wherein said forming step is an etching step.

24. A method for forming a lens element on the end of a waveguide, the waveguide having first and second ends, the waveguide having a waveguiding region and a cladding region that extend between the first and second ends, the waveguide being bounded at the first end by a first end surface that includes a waveguiding surface portion and an abutting cladding surface portion, the method comprising the steps of:

depositing a transparent material layer on the first end surface of the waveguide so that a first portion of the transparent material layer covers the waveguiding surface portion and a second portion of the transparent material layer covers the cladding surface portion;

depositing a layer of positive photoresist on the layer of transparent material so that a first portion of the photoresist covers the first portion of the transparent material layer and a second portion of the photoresist covers the second portion of the transparent material layer, the photoresist having sensitivity at least to light in a particular wavelength range;

injecting light in the particular wavelength range into the second end of the waveguide so that the light traveling along the waveguiding region between the first and second ends and emerging from the waveguiding region at the first end selectively exposes the first portion of the photoresist;

developing the photoresist so as to harden the second portion of the photoresist and remove the first portion of the photoresist;

depositing a protective layer on the first end of the waveguide so that a first portion of the protective layer covers the first portion of the transparent material layer and a second portion of the protective layer covers the second portion of the photoresist;

removing the second portion of the photoresist with the second portion of the protective layer thereon so as to leave the first portion of the protective layer on the first portion of the transparent material layer;

removing at least some of the second portion of the transparent material layer to leave a protruding portion of the transparent material layer aligned with the waveguiding surface portion;

removing the first portion of the protective layer; and forming the protruding portion of the transparent material layer to define the lens element.

25. The method of claim 24 wherein said forming step is a melting step.

26. The method of claim 24 wherein said forming step is an etching step.

* * * * *